United States Patent
Cheng et al.

(10) Patent No.: US 12,088,535 B2
(45) Date of Patent: Sep. 10, 2024

(54) METHODS, BASE STATION AND WIRELESS DEVICE FOR SUPPORTING RADIO COMMUNICATION

(71) Applicant: Telefonaktiebolaget LM Ericsson (publ), Stockholm (SE)

(72) Inventors: Jung-Fu Cheng, Fremont, CA (US); Sorour Falahati, Stockholm (SE); Rui Fan, Beijing (CN); Havish Koorapaty, Saratoga, CA (US); Daniel Larsson, Stockholm (SE); Stefan Parkvall, Bromma (SE); Xinghua Song, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/125,757

(22) PCT Filed: Mar. 17, 2015

(86) PCT No.: PCT/SE2015/050311
§ 371 (c)(1),
(2) Date: Sep. 13, 2016

(87) PCT Pub. No.: WO2015/142271
PCT Pub. Date: Sep. 24, 2015

(65) Prior Publication Data
US 2017/0005775 A1    Jan. 5, 2017

Related U.S. Application Data

(60) Provisional application No. 61/955,244, filed on Mar. 19, 2014.

(51) Int. Cl.
*H04L 5/00* (2006.01)
*H04L 1/1812* (2023.01)
(Continued)

(52) U.S. Cl.
CPC .......... *H04L 5/0098* (2013.01); *H04L 1/1812* (2013.01); *H04L 5/14* (2013.01);
(Continued)

(58) Field of Classification Search
CPC ............................. H04W 16/00; H04W 72/00
See application file for complete search history.

(56) References Cited

U.S. PATENT DOCUMENTS

| | | | |
|---|---|---|---|
| 2012/0176926 A1* | 7/2012 | Jang | H04W 24/02 370/252 |
| 2012/0281680 A1 | 11/2012 | Bostrom et al. | |

(Continued)

FOREIGN PATENT DOCUMENTS

| | | |
|---|---|---|
| CN | 102083154 A | 6/2011 |
| CN | 102611993 A | 7/2012 |

(Continued)

*Primary Examiner* — Alpus Hsu
*Assistant Examiner* — Camquyen Thai

(57) ABSTRACT

A base station (300), a wireless device (302) and methods thereinfor supporting radio communication, wherein the base station (300) employs carrier aggregation with multiple carriers serving a primary cell, PCell, and at least one secondary cell, SCell. The base station (300) signals (3:3) an SCell status to the wireless device (302), the SCell status indicating whether the at least one SCell will be in active state where the base station (300) transmits downlink signals on a carrier serving the at least one SCell, or in inactive state where the base station (300) does not transmit downlink signals on the carrier serving the at least one SCell. Thereby, the wireless device (302) can adapt its behaviour depending on the signalled SCell status, e.g. by turning off its receiver and not perform any signal measurements when the SCell is in inactive state.

36 Claims, 10 Drawing Sheets

(51) Int. Cl.
  *H04L 5/14* (2006.01)
  *H04L 27/26* (2006.01)
  *H04W 16/32* (2009.01)
  *H04W 40/00* (2009.01)
  *H04W 72/23* (2023.01)

(52) U.S. Cl.
  CPC ......... *H04W 16/32* (2013.01); *H04W 40/005* (2013.01); *H04W 72/23* (2023.01); *H04L 27/2601* (2013.01)

(56) References Cited

U.S. PATENT DOCUMENTS

| | | | |
|---|---|---|---|
| 2013/0010641 A1 | 1/2013 | Dinan | |
| 2013/0203458 A1* | 8/2013 | Charbit | H04W 52/34 455/522 |
| 2013/0208587 A1* | 8/2013 | Bala | H04W 16/14 370/230 |
| 2013/0237208 A1* | 9/2013 | Vujcic | H04B 7/15507 455/418 |
| 2013/0344883 A1* | 12/2013 | Rinne | H04W 72/0453 455/452.1 |
| 2014/0036879 A1* | 2/2014 | Pirskanen | H04W 52/365 370/336 |
| 2014/0036889 A1 | 2/2014 | Kim et al. | |
| 2014/0044105 A1* | 2/2014 | Bontu | H04L 5/001 370/336 |
| 2014/0112282 A1* | 4/2014 | Wijting | H04L 5/0098 370/329 |
| 2014/0286211 A1* | 9/2014 | Hiremath | H04W 88/06 370/311 |
| 2015/0065152 A1* | 3/2015 | Sadek | H04W 72/0453 455/450 |
| 2015/0189574 A1* | 7/2015 | Ng | H04W 24/08 370/252 |
| 2015/0215929 A1* | 7/2015 | Damnjanovic | H04L 5/001 370/241 |
| 2015/0245307 A1* | 8/2015 | Chen | H04W 56/0045 370/336 |

FOREIGN PATENT DOCUMENTS

| | | | |
|---|---|---|---|
| CN | 103430606 A | 12/2013 | |
| CN | 103477678 A | 12/2013 | |
| WO | 2011135916 A1 | 11/2011 | |
| WO | 2013020292 A1 | 2/2013 | |
| WO | 2013070138 A1 | 5/2013 | |
| WO | WO-2013143051 A1 * | 10/2013 | .......... H04L 5/0098 |
| WO | WO-2013167557 A1 * | 11/2013 | .......... H04W 74/006 |

* cited by examiner

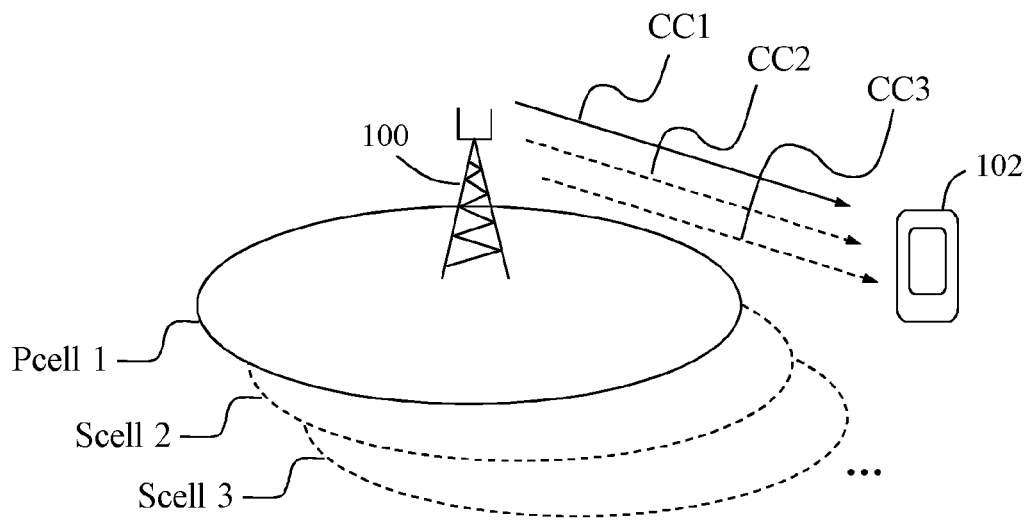
Fig. 1
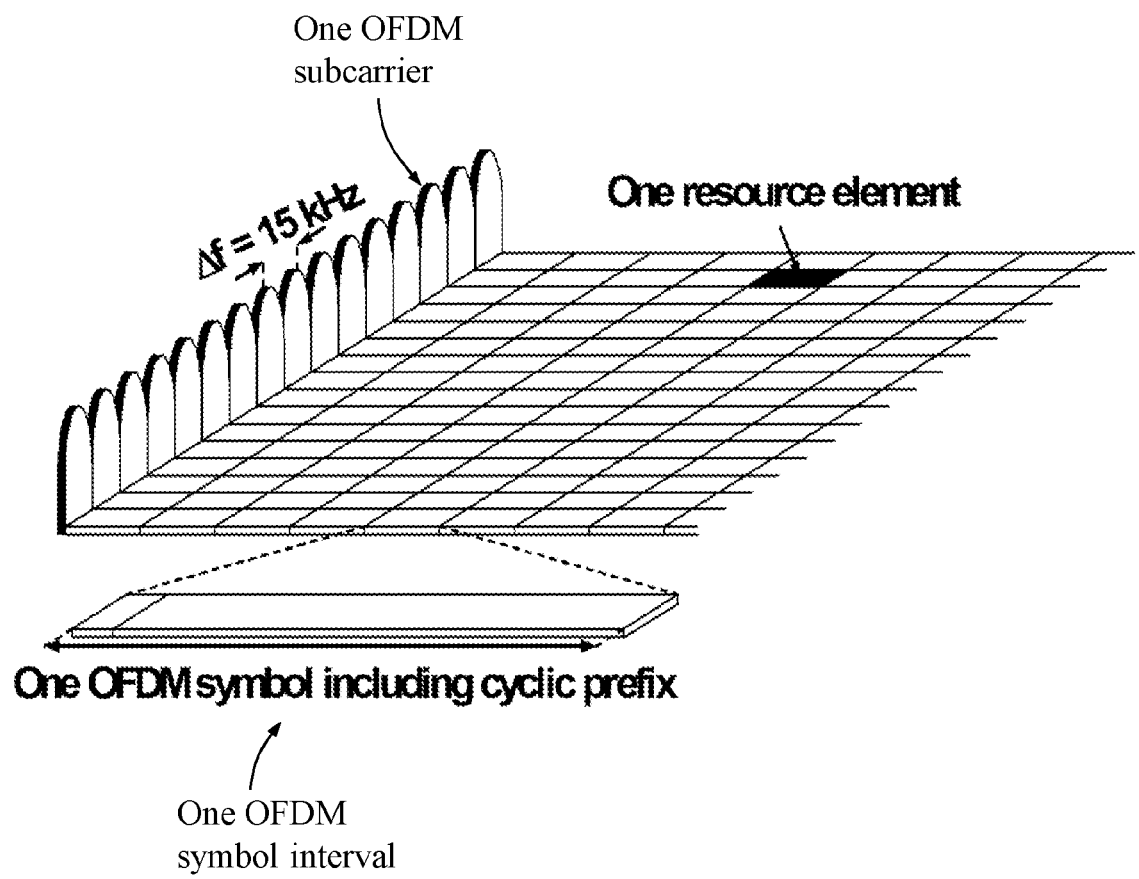
Fig. 2a: The LTE downlink physical resource

Fig. 8: Processing procedures for PDCCHs.

Fig. 10: Illustration of listen before talk.

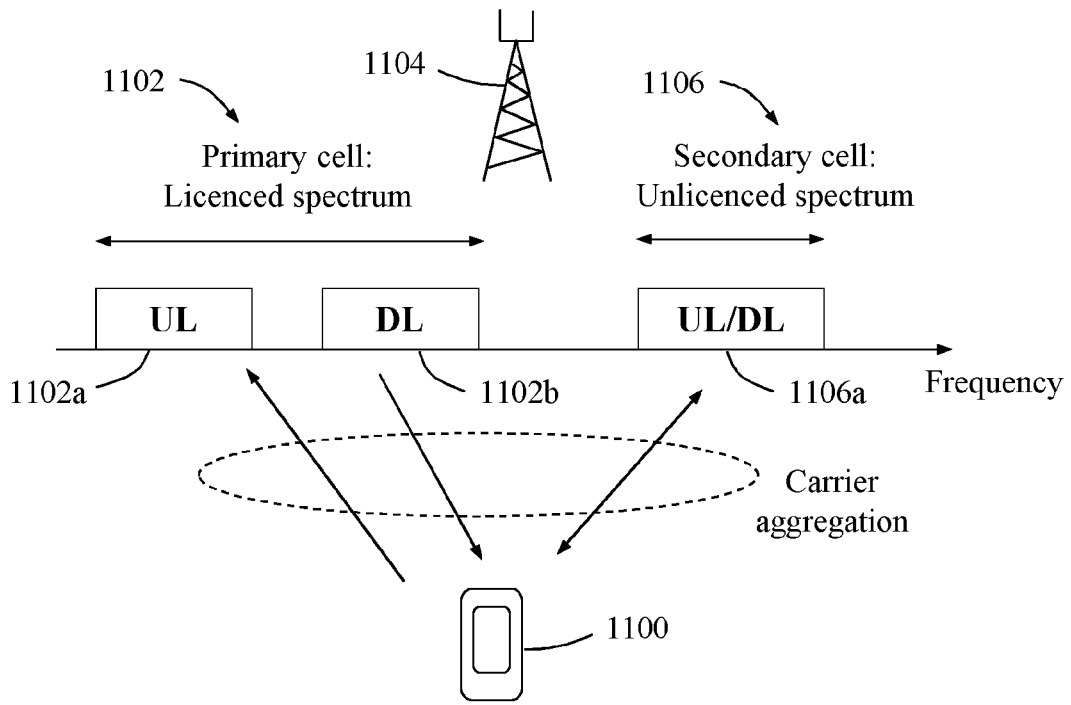
Fig. 11
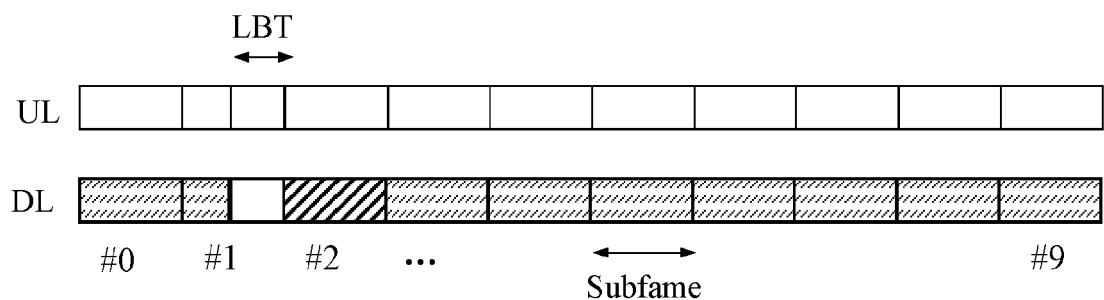
Fig. 12: An illustration of listen before talk opportunity in LTE.

METHODS, BASE STATION AND WIRELESS DEVICE FOR SUPPORTING RADIO COMMUNICATION

TECHNICAL FIELD

The present disclosure relates generally to a base station of a wireless network, a wireless device and methods therein for supporting radio communication between the wireless device and the base station when carrier aggregation is employed.

BACKGROUND

In recent years, different types of wireless networks have been developed to provide radio communication for various wireless terminals in different areas such as cells. The wireless networks, also referred to as cellular or mobile networks, are constantly improved to provide better capacity, quality and coverage to meet the demands from subscribers using services and increasingly advanced terminals, such as smartphones and tablets, which often require considerable amounts of bandwidth and resources for data transport in the networks. Therefore, it is often a challenge to achieve good performance, e.g. in terms of high data throughput, low latency and low rate of dropped or lost data, in the radio communication between base stations in the wireless network and various wireless devices communicating with the base stations.

In the field of radio communication in wireless networks, the terms "wireless terminal" and "User Equipment, UE" are commonly used and will be interchangeably used in this disclosure to represent any mobile phone, tablet or device capable of radio communication with a wireless network including receiving downlink signals transmitted from a serving base station and sending uplink signals to the base station. Further, the terms "base station" and "eNB" will be interchangeably used in this disclosure to represent any node of a wireless network that can communicate uplink and downlink radio signals with wireless terminals or UEs. The base station described here may, without limitation, be a so-called macro node or a so-called low power node such as a micro, pico, femto, Wifi and relay node, to mention some customary examples. Throughout this disclosure, the term "eNB" is frequently used instead of base station.

In order to improve the performance of such radio communication, various radio network features can be employed that are intended to make the radio communication more efficient. In wireless networks operating according to Long Term Evolution, LTE, a feature called Carrier Aggregation, CA, may be used for increasing data throughput and/or performance, as defined by the third Generation Partnership Project, 3GPP. In carrier aggregation, multiple carriers are used simultaneously in radio communication with a wireless device.

However, it is a problem that interference may be generated by excessive signaling particularly caused by measurement reports which are frequently transmitted from wireless terminals to the base station regarding measured downlink signals on different carriers. Another problem is that measurements of reference signals may be inaccurate when carrier aggregation is employed resulting in ill-founded scheduling decisions that may cause further signaling and interference. For example, when many cells of small size are employed to increase capacity, e.g. by using carrier aggregation, thus creating a network with high density, harmful interference may be generated by the considerable amount of transmissions and signaling currently required in such a network. Another problem is that much power is consumed in the wireless devices when making measurements of various reference signals in secondary cells, such that their batteries may be drained rapidly.

SUMMARY

It is an object of embodiments described herein to address at least some of the problems and issues outlined above. It is possible to achieve this object and others by using a base station, a wireless device and methods therein as follows.

According to one aspect, a method is performed by a base station of a wireless network, for supporting radio communication between wireless devices and the base station, wherein the base station employs carrier aggregation with multiple carriers serving a primary cell, PCell, and at least one secondary cell, SCell. In this method, the base station signals an SCell status to the wireless devices, the SCell status indicating whether the at least one SCell will be in active state where the base station transmits downlink signals on a carrier serving the at least one SCell, or in inactive state where the base station does not transmit downlink signals on the carrier serving the at least one SCell. Thereby, the wireless devices are enabled to adapt their behaviour depending on the signalled SCell status, e.g. by turning off their receivers when the SCell is in inactive state.

According to another aspect, a base station of a wireless network is operable to support radio communication between wireless devices and the base station, wherein the base station employs carrier aggregation with multiple carriers serving a primary cell, PCell, and at least one secondary cell, SCell. The base station comprises means configured to signal an SCell status to the wireless devices, the SCell status indicating whether the at least one SCell will be in active state where the base station transmits downlink signals on a carrier serving the at least one SCell, or in inactive state where the base station does not transmit downlink signals on the carrier serving the at least one SCell.

For example, the base station may comprise a processor and a memory, said memory comprising instructions executable by said processor whereby the base station is operative to perform the above method of the base station.

According to another aspect, a method is performed by a wireless device operable for radio communication with a base station of a wireless network. The wireless device is capable of using carrier aggregation with multiple carriers serving a primary cell, PCell, and at least one secondary cell, SCell In this method, the wireless device receives an SCell status from the base station, the SCell status indicating whether the at least one SCell will be in active state where the base station transmits downlink signals on a carrier serving the at least one SCell, or in inactive state where the base station does not transmit downlink signals on the carrier serving the at least one SCell.

According to another aspect, a wireless device is operable for radio communication with a base station of a wireless network and the wireless device is capable of using carrier aggregation with multiple carriers serving a primary cell, PCell, and at least one secondary cell, SCell. The wireless device comprises means configured to receive an SCell status from the base station, the SCell status indicating whether the at least one SCell will be in active state where the base station transmits downlink signals on a carrier serving the at least one SCell, or in inactive state where the base station does not transmit downlink signals on the carrier serving the at least one SCell.

For example, the wireless device may comprise a processor and a memory, said memory comprising instructions executable by said processor whereby the wireless device is operative to perform the above method of the wireless device.

The above methods, base station and wireless device may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIG. 1 is a communication scenario illustrating radio communication with carrier aggregation, according to the prior art.

FIG. 2a is a schematic illustration of LTE downlink physical resources, according to the prior art.

FIG. 11 is a schematic illustration of how a secondary cell may be employed by a base station in unlicensed spectrum, which may be used in at least some of the embodiments herein.

FIG. 12 is another schematic illustration of a procedure for Listen Before Talk, LBT, which may be performed by a base station in the embodiments herein.

DETAILED DESCRIPTION

Figure 2B:
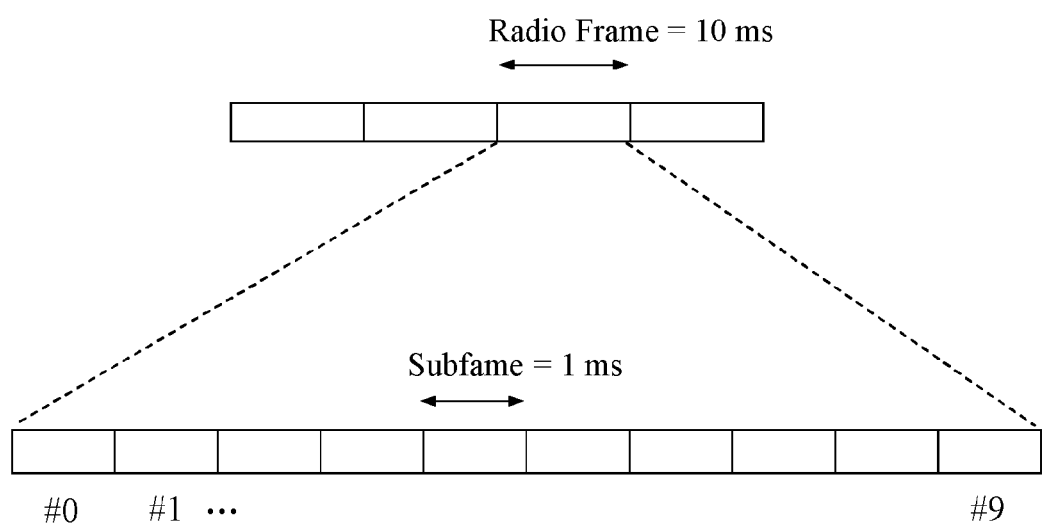
FIG. 2b is a schematic illustration of a radio frame in LTE, according to the prior art.

In carrier aggregation, a base station is thus able to communicate radio signals with a wireless device simultaneously over two or more different carriers, sometimes referred to as Component Carriers, CC, corresponding to multiple cells serving the wireless device, which is illustrated by an example in FIG. 1. In this example, a base station 100 sends downlink signals to a wireless device 102 over three different component carriers CC1, CC2 and CC3 which in turn provide coverage in three corresponding cells. It should be noted that the configuration with three component carriers and corresponding cells shown in FIG. 1 is just an illustrative example, and any number of carriers and cells may be employed for the carrier aggregation.

When serving the wireless device 102 with the carriers CC1, CC2 and CC3, one of the cells is appointed to act as a Primary cell, Pcell, in FIG. 1 denoted Pcell 1 which is served by a component carrier CC1. The other two cells are appointed to act as Secondary cells, Scells, denoted Scell 2 and Scell 3 which are served by component carriers CC2 and CC3, respectively. In this field of technology, a Pcell is defined as the "main" cell serving the wireless device such that both data and control signaling can be transmitted over the Pcell, while an Scell is defined as a supplementary cell that is typically used for transmitting data only, the Scell thus adding extra bandwidth to enable greater data throughput.

The above is applicable for both downlink and uplink signals. Further, the appointment of a Pcell and one or more Scells is made per device such that a particular carrier, or component carrier, may be used in a Pcell for one wireless device and in an Scell for another wireless device. For example in FIG. 1, the component carrier CC1 which is used for serving the device 102 in a Pcell could at the same time be used for serving another device, not shown, in an Scell. Similarly, the component carrier CC2, or CC3, which is used for serving the device 102 in an Scell could at the same time be used for serving another device in a Pcell.

Carrier aggregation may thus be used in radio communication with a wireless device to support wider transmission bandwidths. The wireless device must have reception and/or transmission capabilities for carrier aggregation such that it can simultaneously receive and/or transmit on multiple carriers, which is the case for devices configured according to the third Generation Partnership Project, 3GPP, Rel-10 or later. In this way, the base station is able to serve several cells with basically the same coverage area as shown in FIG. 1, or with different coverage areas, at different carrier frequencies.

Carrier aggregation can be used both for uplink communication and for downlink communication. Further, it is possible to configure a wireless device to aggregate a different number of carriers in the uplink than in the downlink, still originating from the same base station, thus enabling different bandwidths in uplink and downlink. The maximum number of downlink carriers that can be configured for a wireless device depends on the downlink aggregation capability of the device. Similarly, the maximum number of uplink carriers that can be configured depends on the uplink aggregation capability of the device.

In order to provide improved throughput to meet the demands from users, applications and services, more and more frequency spectrum is thus needed. Due to regulatory limitations, the dedicated spectrum allocated, i.e. licensed to networks operating according to Long Term Evolution, LTE, is often not enough. It is thus of interest to enable such LTE networks to operate in unlicensed spectrum in addition to their licensed spectrum. Since unlicensed spectrum can be used by other systems and technologies as well, e.g. Wifi, when an LTE network operates in unlicensed spectrum, the network needs to ensure successful coexistence with other systems particularly by avoiding collisions between transmissions in the unlicensed spectrum. This problem is not limited to LTE networks but may occur in any wireless networks using unlicensed or shared spectrum. To accomplish this, it may be required that a mechanism denoted "Listen before Talk", LBT, is adopted by the LTE network. LBT means that a sender, i.e. transmitting node, first needs to detect if a channel is occupied or not before it transmits on the channel. If the channel is not occupied, the sender can transmit as it is, otherwise, the sender is not allowed to transmit. Whether a sender can transmit or not is only known by the sender. The receiver cannot know this information even though its behavior, e.g. related to signal measurements and monitoring, will be affected.

In the following description, a wireless device may be alternatively referred to as a UE or a terminal, and a base station may be alternatively referred to as an eNB. Even though LTE is frequently used as an example in this disclosure, the embodiments described herein are not limited to LTE networks and systems. Typically in LTE, Orthogonal Frequency Division Multiplex, OFDM, is used for transmissions in the downlink and Discrete Fourier Transform, DFT, spread OFDM is used for transmissions in the uplink. The basic LTE downlink physical resource can thus be seen as a time-frequency grid as illustrated in FIG. 2a where each resource element corresponds to one OFDM subcarrier during one OFDM symbol interval. In the time domain, LTE downlink transmissions are organized into radio frames of 10 ms, each radio frame having ten equally-sized subframes 0-9 of length 1 ms, as shown in FIG. 2b.

The embodiments described herein may be used for improving efficiency and performance in a wireless network when carrier aggregation is employed for downlink transmissions in a primary cell, PCell, and in at least one secondary cell, SCell. In particular, the solution enables reduction of interference and improvement of performance in the network when a base station signals to a wireless device an indication whether at least one SCell will be in active state or in inactive state. In this disclosure, saying that the at least one SCell is in active state means that the base station transmits downlink signals on a carrier serving the at least one SCell, and saying that the at least one SCell is in inactive state means that the base station does not transmit downlink signals on the carrier serving the at least one SCell. The term active state thus indicates that the base station can use the at least one SCell for transmission, while the term inactive state indicates that the base station does not transmit on the at least one SCell. In this disclosure, the above active and inactive states will also be referred to as activated SCell and inactivated SCell, respectively.

Thereby, when the base station activates and inactivates the at least one SCell on a dynamic basis, e.g. in adaption to current traffic conditions, and signals the CSell state accordingly, the wireless device is able to immediately adapt its behavior depending on whether the SCell is used for downlink transmission or not. For example, the wireless device may turn off reception on the SCell when the SCell is in inactive state, thus saving power in the device, and/or it may refrain from monitoring and measuring reference signals on the SCell when the SCell is in inactive state to avoid inaccurate measurement results and wasted operation.

In this way, the at least one SCell can be used by the base station in a flexible manner in adaption to fluctuating traffic conditions without causing unnecessary signaling of irrelevant measurements since the wireless device will know whether the SCell is in active or inactive state and adapt its measuring activities accordingly. The performance in the wireless device may also be improved or even optimized, e.g. by saving power and avoiding unnecessary measuring and signaling of irrelevant measurements when the SCell is in inactive state. Further, erroneous scheduling decisions based on misleading measurement reports from the wireless device may also be avoided and any measurement reports from the wireless device can be trusted since it makes signal measurements on the SCell only when the SCell is signaled to be in active state while no signal measurements are made on the SCell in inactive state.

Some examples of how the solution may be employed will now be described with reference to the signaling diagram in FIG. 3 which illustrates procedures with actions performed by a base station 300 and a wireless device 302, respectively, to accomplish the functionality described above. The base station 300 is operative to support radio communication between wireless devices, such as device 302, and the base station, wherein the base station employs carrier aggregation with multiple carriers serving a primary cell, PCell, and at least one secondary cell, SCell. Further, the wireless device 302 is operative for radio communication with a base station of a wireless network, such as base station 300, the wireless device 302 being capable of using carrier aggregation with multiple carriers serving a primary cell, PCell, and at least one secondary cell, SCell.

It is thus assumed that the wireless device 302 is being served by the base station 300 and that the device 302 is able to communicate radio signals with the base station 300. A first optional action 3:1 illustrates that the wireless device 302 may notify the base station 300 that the wireless device supports carrier aggregation, e.g. by sending a suitable capability message to the base station 300. However, this action may alternatively be omitted and the following actions may be performed regardless of whether the base station 300 is informed whether the device supports carrier aggregation or not.

Another optional action 3:2 illustrates that the base station 300 determines an SCell status indicating whether the at least one SCell will be in active state or in inactive state, that is whether the base station 300 will transmit any downlink signals on a carrier serving the at least one SCell, or not. It was mentioned above that an SCell can be employed so as to increase the capacity in the network. In this action, the base station 300 may thus determine whether it is necessary or desirable to increase data throughput and/or performance by utilizing the at least one SCell, or not, e.g. depending on the current traffic load and/or need for data transmissions. For example, if the demands for data transmissions falls under a certain threshold, the base station 300 may decide to "turn off" the SCell by putting it in inactive state. Before putting the SCell in active state again, whenever needed e.g. at increased traffic load, the base station 300 may adopt the above-described LBT mechanism to ensure that the frequency of the SCell is not used for other transmissions.

In a following action 3:3, the base station 300 signals the SCell status to the wireless devices, including device 302, where the SCell status indicates whether the at least one SCell will be in active state where the base station transmits downlink signals on a carrier serving the at least one SCell, or in inactive state where the base station transmits no downlink signals on the carrier serving the at least one SCell. Another action 3:4 illustrates that the wireless device 302 receives the SCell status from the base station 300, the SCell status indicating whether the at least one SCell will be in active state where the base station transmits downlink signals on a carrier serving the at least one SCell, or in inactive state where the base station transmits no downlink signals on the carrier serving the at least one SCell.

A final shown action 3:5 illustrates that the wireless device 302 may adapt its behavior in accordance with the received SCell status e.g. by controlling its receiver. For example, the wireless device 302 may in a possible embodiment turn off reception on the at least one SCell in this action, when the SCell status indicates that the at least one SCell is in inactive state. The wireless device 302 may further monitor the SCell and perform signal measurements on the SCell only when the SCell status indicates active state but not when the SCell status indicates inactive state.

Various further embodiments are possible to employ by the base station and by the wireless device as follows.

In a possible embodiment, the base station 300 may serve the PCell on licensed frequency spectrum and may further serve the SCell on unlicensed frequency spectrum. Thereby, the unlicensed frequency spectrum may be utilized by activating the SCell only when the licensed frequency spectrum is insufficient for meeting current traffic demands and extra bandwidth is needed. In another possible embodiment, the signaled SCell status may, when such unlicensed frequency spectrum is used for the SCell, indicate that the at least one SCell will be in the active state as a result when the base station has detected that the unlicensed frequency spectrum is idle and available for radio communication by the wireless devices on the SCell. Alternatively, the base station may, according to a further possible embodiment, serve both the PCell and the SCell on licensed frequency spectrum. In another possible embodiment, the wireless device may notify the base station, e.g. in action 3:1, that it is capable of being served by the SCell on unlicensed frequency spectrum.

In another possible embodiment, the signaled SCell status may indicate that the at least one SCell will be in the inactive state when the base station has capacity and resources for serving all the wireless devices on the PCell, e.g. as in the example discussed above when the unlicensed frequency spectrum is not needed to meet the traffic demands.

In the signaling action 3:3 above, the SCell status may be signaled and carried in different optional ways as follows.

In one possible embodiment, the SCell status may be carried by a Physical Downlink Control Channel, PDCCH, scrambled by a Radio Network Temporary Identifier, RNTI, that indicates the SCell status. In another possible embodiment, the base station provides the RNTI to at least one of the wireless devices, e.g. by suitable signaling such as broadcasting or dedicated signaling. In a further possible embodiment, the wireless device 302 may acquire from the base station 300 a frame/subframe on which the SCell status can be monitored in group/common signaling and a group/common RNTI to be used for detecting the group/common signaling.

In another alternative embodiment, the SCell status may be carried by a Physical Hybrid ARQ Indicator Channel, PHICH. In other alternative embodiments, the SCell status may be carried by a new physical channel in a control region of a subframe, e.g. for any of: a Physical Control Format Indicator Channel, PCFICH, a Physical Downlink Control Channel PDCCH, and a Physical Hybrid ARQ Indicator Channel PHICH.

In further possible embodiments, the base station may signal the SCell status with a certain periodicity related to a radio frame length, e.g. with a periodicity of five subframes. In another possible embodiment, the base station may signal the SCell status on a carrier serving the PCell. In another possible embodiment, the base station may signal the SCell status by a bit indicating whether the SCell will be in the active state or in the inactive state. In another possible embodiment, the base station may signal the SCell status by multiple bits indicating whether respective multiple SCells will be in the active state or in the inactive state.

In another possible embodiment, the signaled SCell status may indicate that the at least one SCell will be in the active state for a predetermined time duration, e.g. corresponding to five subframes. This time duration may be stored in the base station and be configured to the wireless device via higher layer signaling. In yet another possible embodiment, the signaled SCell status may indicate that the at least one SCell will be in the active state according to an indicated Time Division Duplex, TDD, uplink/downlink configuration during a certain time period, wherein the time period is predefined or indicated in the signaled SCell status.

In another possible embodiment, the signaled SCell status may comprise an activity value indicating a number of subframes in which the at least one SCell will be in active state. Another possible embodiment may be that the signaled SCell status comprises multiple activity values valid for respective multiple SCells, each activity value indicating a number of subframes in which each respective SCell will be in active state.

In yet another possible embodiment, the base station may signal the SCell status to one or more neighboring base stations. If a neighboring base station receives the SCell status, it may adapt its operation accordingly. The signaled SCell status may contain an indication of which operator has sent the message. If the neighboring base station identifies that the message is from the same operator's network, the neighboring base station can use the spectrum of the SCell since it can be assumed that transmissions on the SCell are sufficiently separated spatially, or alternatively that other interference mitigation techniques may be used within the same operators' network. If, however, the message is from another operator, the receiving neighboring base station may refrain from the using the spectrum if the SCell status indicates that the SCell is in active state.

Some examples of how at least some of the above embodiments may be implemented in practice, will be described later below.

Figure 4:
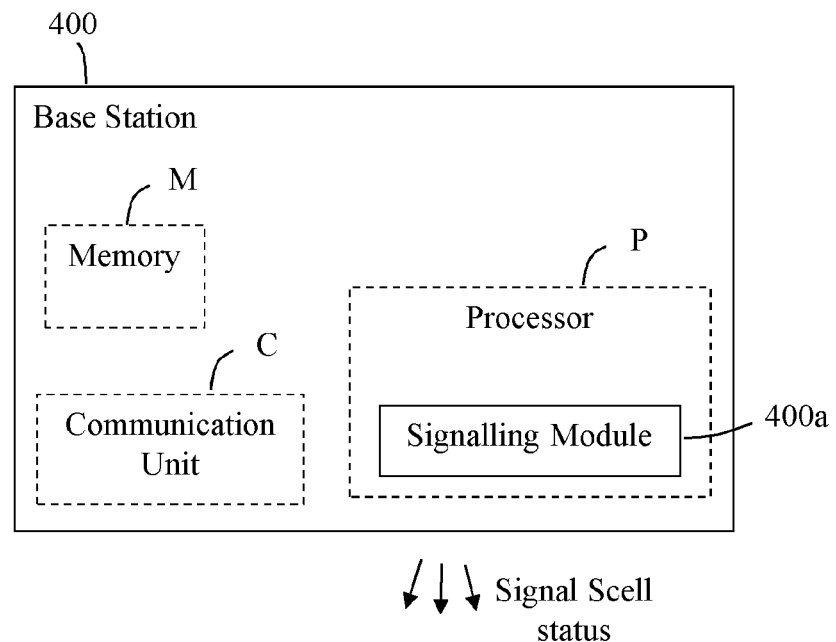
FIG. 4 is a block diagram illustrating a base station, according to some possible embodiments.
Figure 5:
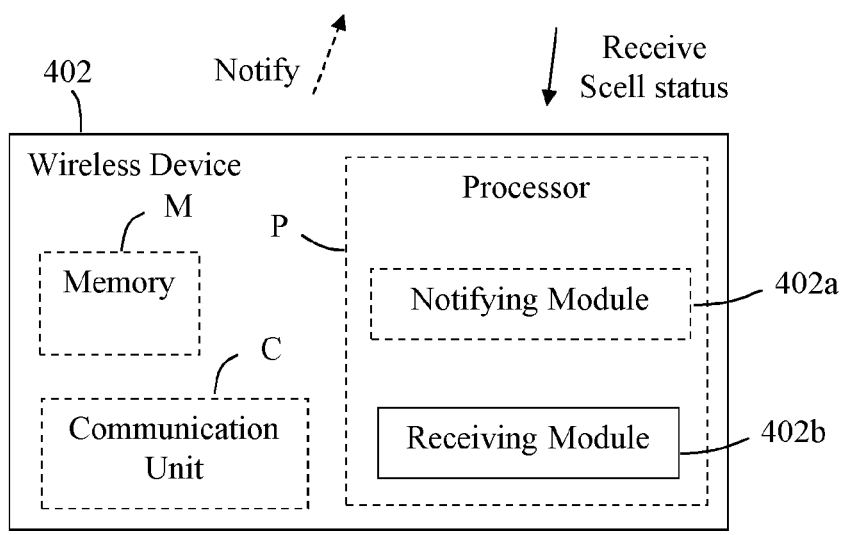
FIG. 5 is a block diagram illustrating a wireless device, according to further possible embodiments.

A detailed but non-limiting example of how a base station of a wireless network and a wireless device may be structured with some possible functional entities such as modules, circuits or units, to bring about the above-described functionalities of the base station and the wireless device, is illustrated by the block diagrams in FIGS. 4 and 5. In these figures, the base station 400 is operable to support radio communication between wireless devices and the base station, wherein the base station 400 employs carrier aggregation with multiple carriers serving a primary cell, PCell, and at least one secondary cell, SCell. Further, the wireless device 402 is operable for radio communication with a base station 400 of a wireless network, the wireless device 402 being capable of using carrier aggregation with multiple carriers serving a primary cell, PCell, and at least one secondary cell, SCell.

The base station 400 and the wireless device 402 correspond to the base station 300 and the wireless device 302 of FIG. 3 and they may operate according to any of the features and embodiments described above for FIG. 3. The communication circuit C in each of the base station 400 and the wireless device 402 thus comprises equipment configured for communication with each other over a radio interface using a suitable protocol for radio communication depending on the implementation. The solution is however not limited to any specific types of data or protocols.

In order to put any of the embodiments herein into practice, each of the base station and the wireless device may be implemented with a communication unit "C", a memory "M" and an operable processor "P", where each processor P may comprise one or more functional modules as described below.

Figure 3:
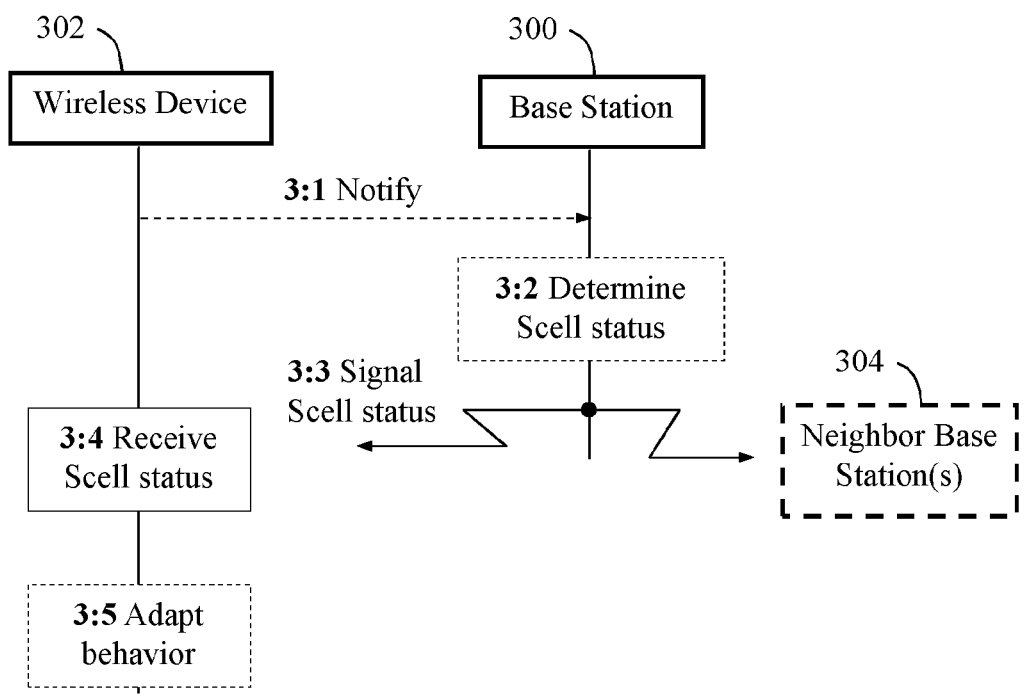
FIG. 3 is a signaling diagram illustrating a procedure involving a base station and a wireless device, according to further possible embodiments.

The base station 400 comprises means configured or arranged to perform at least action 3:3 of the signaling diagram in FIG. 3 in the manner described above. Further, the wireless device 402 comprises means configured or arranged to perform at least action 3:4 of the signaling diagram in FIG. 3 in the manner described above.

The base station 400 thus comprises the processor P and the memory M, said memory M comprising instructions executable by said processor P, whereby the base station 400 is configured to operate as follows.

More specifically, the base station 400 is configured to signal an SCell status to the wireless devices, including device 402, the SCell status indicating whether the at least one SCell is in active state where the base station transmits downlink signals on a carrier serving the at least one SCell, or in inactive state where the base station transmits no downlink signals on the carrier serving the at least one SCell. This signaling operation may be performed by a signaling module 400a.

The wireless device 402 likewise comprises the processor P and the memory M, said memory M comprising instructions executable by said processor P, whereby the wireless device 402 is configured to operate as follows. The wireless device 402 may be configured to notify the base station that the wireless device supports carrier aggregation. This notifying operation may be performed by a notifying module 402a. The wireless device 402 is also configured to receive an SCell status from the base station, the SCell status indicating whether the at least one SCell is in active state where the base station transmits downlink signals on a carrier serving the at least one SCell, or in inactive state where the base station transmits no downlink signals on the carrier serving the at least one SCell. This receiving operation may be performed by an receiving module 402b.

It should be noted that FIGS. 4 and 5 illustrate some possible entities and functional modules in the base station 400 and the wireless device 402, and the skilled person should be able to implement these functional entities and modules in practice using suitable software and hardware. Thus, the solution is generally not limited to the shown structures of the base station 400 and the wireless device 402, and their respective functional modules 400a, 402a-b may be configured to operate according to any of the embodiments and features described in this disclosure, where appropriate.

The embodiments and features described herein may be implemented by means of suitable computer programs in the base station 400 and the wireless device 402, respectively, each computer program comprising computer readable code which, when run on the base station and wireless device, causes them to perform methods as described above. Further, the above-described embodiments may be implemented in computer program products, each computer program product comprising a computer readable medium on which the respective computer program is stored. Each computer program product may be a compact disc or other carrier suitable for holding the computer program. Some examples of how the respective computer program and computer program product can be realized in practice are outlined below.

The functional modules 400a, 402a-b described above for FIGS. 4 and 5 may be implemented in the base station 400 and the wireless device 402, respectively, by means of program modules of a respective computer program comprising code means which, when run by each processor "P" causes the base station 400 and the wireless device 402 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the base station 400 and the wireless device 402 in the form of the shown memory M having a computer readable medium and being connected to the processor P. The computer program product or memory M thus comprises a computer readable medium on which the computer program is stored e.g. in the form of computer program modules. For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the respective base station 400 and wireless device 402.

Some examples will now be described of how at least some of the above embodiments may be implemented in practice, mostly in the context of an LTE network although the embodiments are not generally limited thereto. A terminology commonly used for LTE will be chiefly used herein for illustrative purposes, where for example the term UE can be exchanged by wireless device and the term eNB can be exchanged by base station.

Resource allocation in LTE is typically described in terms of resource blocks, where a resource block corresponds to one slot of 0.5 ms in the time domain and 12 contiguous subcarriers in the frequency domain. A pair of two adjacent resource blocks in time of 1.0 ms duration is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Figure 6:
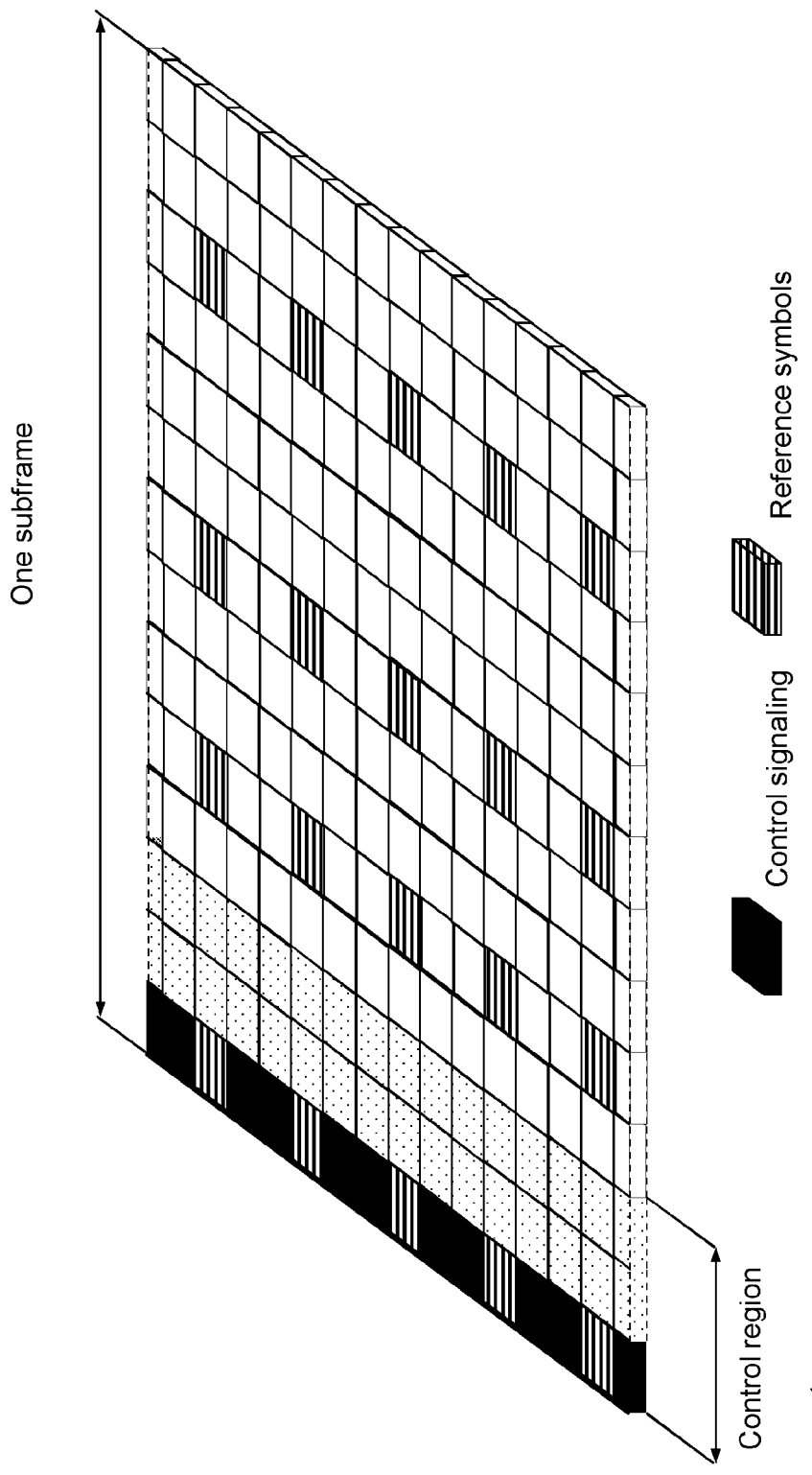
FIG. 6 is a schematic illustration of a downlink subframe in LTE, which may be used in at least some of the embodiments herein.

Downlink transmissions are often dynamically scheduled, i.e., in each subframe the base station transmits control information indicating to which UEs data is transmitted and upon which resource blocks the data is transmitted, in the current downlink subframe. This control signaling is typically transmitted in the first 1, 2, 3 or 4 OFDM symbols in each subframe and the number n=1,2,3 or 4 is known as the Control Format Indicator (CFI). The downlink subframe also contains common reference symbols, which are known to the receiver and used for coherent demodulation of e.g. the control information. It was mentioned above that the SCell status signaled in action 3:3 may be carried by a new physical channel in a control region of a subframe. A downlink subframe having CFI=3 OFDM symbols in the control region is illustrated in FIG. 6, which may be used for carrying the SCell status.

From LTE Release 11 (Rel-11) onwards above described resource assignments can also be scheduled on the enhanced Physical Downlink Control Channel (EPDCCH). For LTE Rel-8 to Rel-10, only the Physical Downlink Control Channel (PDCCH) is available.

It was further mentioned above that the SCell status signaled in action 3:3 may be carried by a Physical Hybrid ARQ Indicator Channel, PHICH. LTE typically uses hybrid-ARQ (HARQ), where, after receiving downlink data in a subframe, the UE attempts to decode the data and reports to the base station whether the decoding was successful (ACK) or not (NACK) via the Physical Uplink Control CHannel (PUCCH). In case of an unsuccessful decoding attempt, the base station can retransmit the erroneous data. Similarly, the base station can indicate to the UE whether the decoding of data transmitted on the PUSCH was successful (ACK) or not (NACK) via the Physical Hybrid ARQ Indicator CHannel (PHICH).

The downlink Layer 1/Layer 2 (L1/L2) control signaling transmitted in the control region may comprise the following different physical-channel types:

The Physical Control Format Indicator Channel (PCFICH), which is used for informing the UE about the size of the control region, e.g. one, two, or three OFDM symbols. There may be one and only one PCFICH on each component carrier or, equivalently, in each cell.

The Physical Downlink Control Channel (PDCCH), which is typically used to signal downlink scheduling assignments and uplink scheduling grants. Each PDCCH typically carries signaling for a single UE, but it can also be used to address a group of UEs. Multiple PDCCHs can exist in each cell.

The Physical Hybrid-ARQ Indicator Channel (PHICH), used to signal hybrid-ARQ acknowledgements in response to uplink UL-SCH transmissions. Multiple PHICHs can exist in each cell.

These physical channels are organized in units of a resource element group (REG), which may comprise four closely spaced resource elements. The PCFICH occupies four REGs and a PHICH group occupies three REGs.

PHICH Processing

Figure 7:
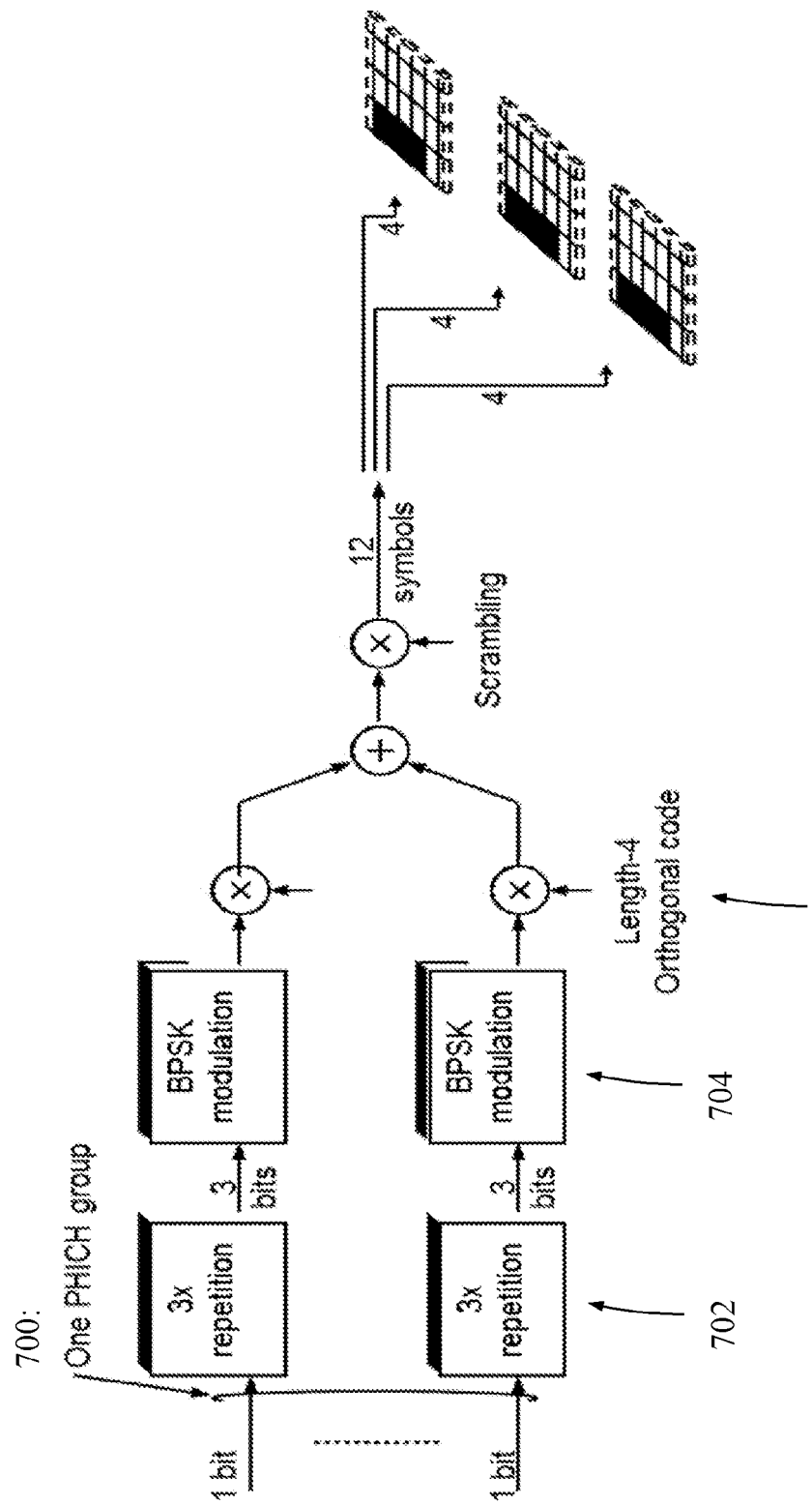
FIG. 7 is a schematic illustration of encoding processing of the PHICH channel in LTE where the orthogonal code length is four, which may be used in at least some of the embodiments herein.

The PHICH is used for transmission of hybrid-ARQ acknowledgements in response to UL-SCH transmission. There is one PHICH transmitted per received transport block and Transmission Time Interval, TTI—that is, when uplink spatial multiplexing is used on a component carrier, two PHICHs are used to acknowledge the transmission, one per transport block. For proper operation of the hybrid-ARQ protocol, the error rate of the PHICH should be sufficiently low. Therefore, it is preferable to spread each PHICH on multiple resource elements to capture frequency diversity. To fulfill this, as shown in FIG. 7, a structure is used in LTE where several PHICHs are code multiplexed on to a set of resource elements, thus forming a PHICH group 700. FIG. 7 illustrates encoding processing of the LTE PHICH channel where the orthogonal code length is four.

In this example, the hybrid-ARQ acknowledgement, comprised in one single bit of information per transport block, is repeated three times at block 702, followed by BPSK modulation at block 704 on either the I or the Q branch and spreading with a length-four orthogonal sequence at block 706. A set of PHICHs transmitted on the same set of resource elements is thus called a PHICH group 700, where a PHICH group comprises eight PHICHs in the case of normal cyclic prefix. An individual PHICH can thus be uniquely represented by a single number from which the number of the PHICH group, the number of the orthogonal sequence within the group, and the branch, I or Q, can be derived.

PDCCH

It was further mentioned above that the SCell status signaled in action 3:3 of FIG. 3 may be carried by a Physical Downlink Control Channel, PDCCH, scrambled by a Radio Network Temporary Identifier, RNTI, that indicates the SCell status. The PDCCH may be used to carry downlink control information (DCI) such as scheduling decisions and power-control commands. More specifically, the DCI may include any of:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of UEs as a complement to the commands included in the scheduling assignments/grants.

One PDCCH may carry one DCI message with one of the formats above. As multiple UEs can be scheduled simultaneously, on both downlink and uplink, there should preferably be a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation may be used, where the code rate of the PDCCH is selected to match the radio-channel conditions.

To allow for simple yet efficient processing of the control channels in the UE, the mapping of PDCCHs to resource elements may be subject to a certain structure. This structure may be based on Control-Channel Elements (CCEs), which may comprise nine REGs. The number of CCEs, one, two, four, or eight, required for a certain PDCCH depends on the payload size of the control information (DCI payload) and the channel-coding rate. This may be used to realize link adaptation for the PDCCH. If the channel conditions for the UE to which the PDCCH is intended are disadvantageous, a larger number of CCEs needs to be used compared to the case of advantageous channel conditions. The number of CCEs used for a PDCCH is also referred to as the "aggregation level" (AL).

Figure 8:
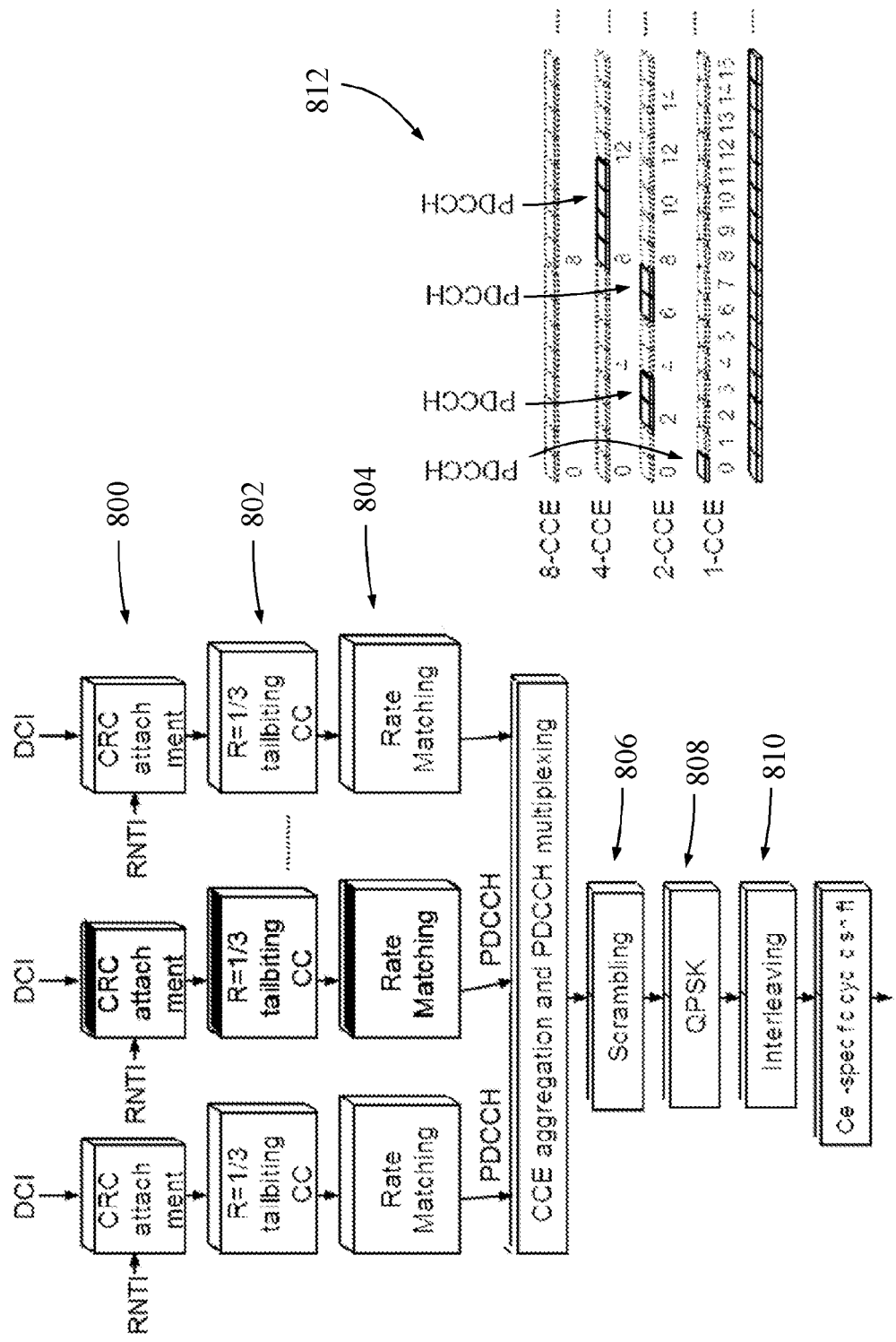
FIG. 8 is a schematic illustration of processing procedures for PDCCHs, which may be used in at least some of the embodiments herein.

The network can then select different aggregation levels and PDCCH positions for different UEs from the available PDCCH resources. For each PDCCH, as illustrated in FIG. 8, a CRC is attached to each DCI message payload at block 800. The identity of the UE (or UEs) addressed—that is, the RNTI—is included in the CRC calculation and not explicitly transmitted. Depending on the purpose of the DCI message (unicast data transmission, power-control command, random-access response, etc.), different RNTIs are used; for normal unicast data transmission, the UE-specific C-RNTI is used. After CRC attachment, the bits are coded with a rate-1/3 tail-biting convolutional code at block 802 and rate matched at block 804 to fit the amount of resources used for PDCCH transmission. After the PDCCHs to be transmitted in a given subframe have been allocated to the desired resource elements (the details of which are given below), the sequence of bits corresponding to all the PDCCH resource elements to be transmitted in the subframe, including the unused resource elements, may be scrambled by a cell- and subframe-specific scrambling sequence at block 806, to randomize inter-cell interference, followed by QPSK modulation at block 808 and mapping to resource elements. The entire collection of the REGs (including those unused by any PDCCH) may then be interleaved at block 810 across the entire control region to randomize inter-cell interference as well as capturing frequency diversity for the transmitted PDCCHs 812, each PDCCH comprising one, two, four, or eight CCEs as indicated in the figure.

PDCCH Search Space

Figure 9:
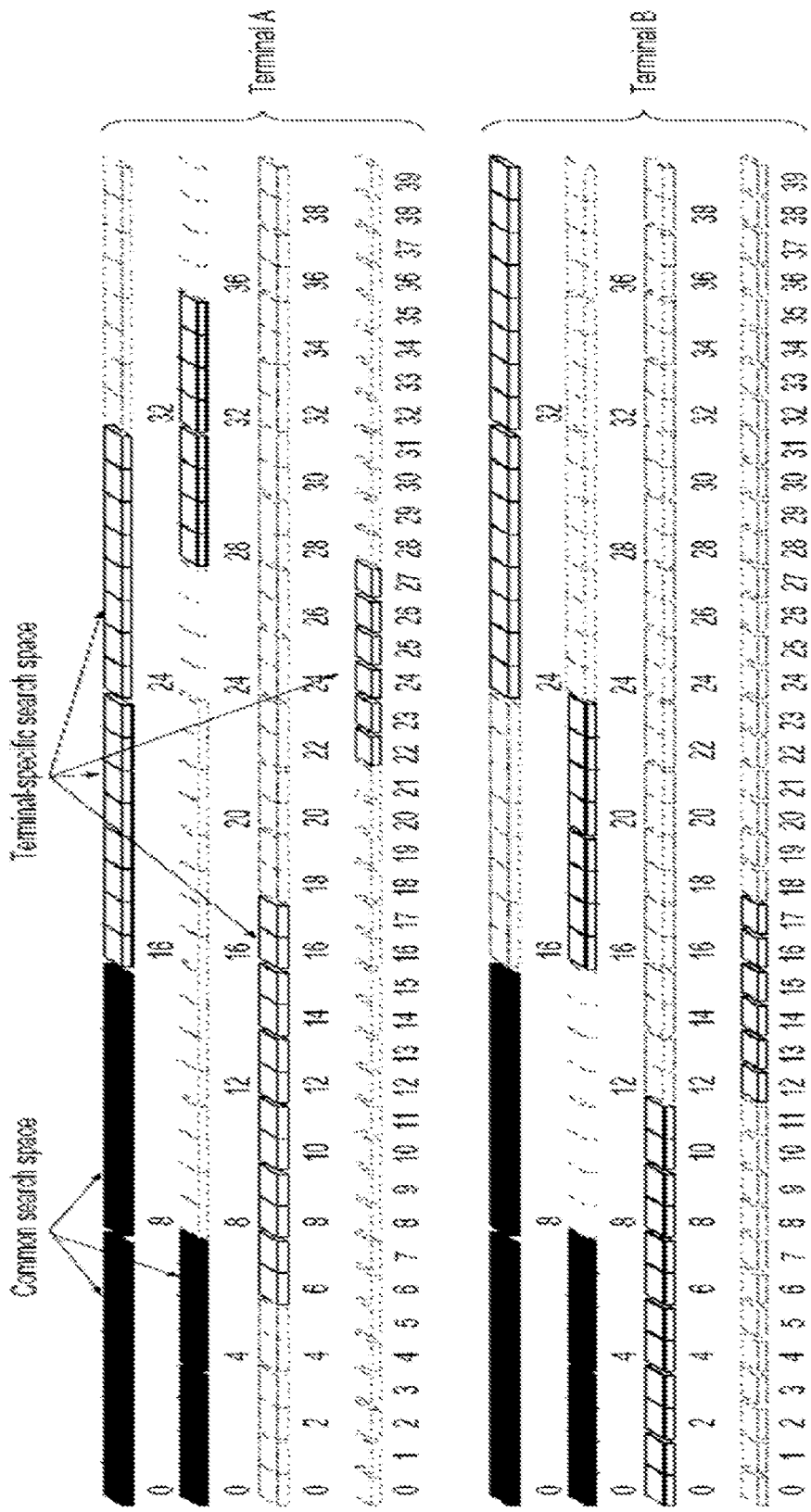
FIG. 9 is a schematic illustration of subframes that form common and device-specific search spaces for two wireless devices, which may be used in at least some of the embodiments herein.

LTE defines so-called search spaces, which describe the set of CCEs the UE is supposed to monitor for scheduling assignments/grants relating to a certain component carrier. A search space is a set of candidate control channels formed by CCEs on a given aggregation level, which the UE is supposed to attempt to decode. As there are multiple aggregation levels, corresponding to one, two, four, and eight CCEs as shown in FIG. 8, a UE has multiple search spaces. In each subframe, the UEs will typically attempt to decode all the PDCCHs that can be formed from the CCEs in each of its search spaces. If the CRC checks, the content of the control channel is declared as valid for this UE and the UE is able to process the information (scheduling assignment, scheduling grants, etc.). Each UE in the system therefore has a UE or terminal-specific search space at each aggregation level. An example of how search spaces may be arranged in a subframe scheme for two UEs is illustrated in FIG. 9 where the UEs are denoted "Terminal A" and "Terminal B". FIG. 9 is thus an Illustration of how common and UE-specific search spaces may be distributed over time for the two UEs Terminal A and Terminal B. The common search space, marked black, is monitored by both UEs while each terminal-specific search space is monitored only by the concerned UE, e.g. terminal A monitors the terminal-specific search space for terminal A as indicated by arrows in the figure.

In several situations, there may be a need to address a group of, or all, UEs present in the network. To allow all UEs to be addressed at the same time, LTE has defined common search spaces in addition to the UE-specific search spaces. A common search space is, as the name implies, common, and all UEs in the cell monitor the CCEs in the common search spaces for control information. Thus, both terminals A and B monitors the black-marked common search space.

Although the motivation for the common search space is primarily transmission of various system messages, it can be used to schedule individual UEs or terminals as well. Thus, it can be used to resolve situations where scheduling of one UE is blocked due to lack of available resources in the UE-specific search space. More important, the common search space is not dependent of UE configuration status. Therefore, the common search space can be used when the network needs to communicate with the UE during UE reconfiguration periods.

Carrier Aggregation

The LTE Rel-10 standard has recently been defined and standardized, supporting bandwidths larger than 20 MHz. A requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 UE. Each such carrier thus corresponds to the Component Carrier (CC) described above for FIG. 1. In particular for early LTE Rel-10 deployments it can be expected that there may be a smaller amount of LTE Rel-10-capable UEs or terminals in operation, compared to many LTE legacy UEs. Therefore, it may be necessary to assure an efficient use of a wide carrier also for legacy UEs, i.e. to assure that it is possible to implement carriers where legacy UEs can be scheduled in all parts of the wideband LTE Rel-10 carrier. The straightforward way to obtain this would be by means of Carrier Aggregation (CA) which has been described above with reference to FIG. 1. CA implies that an LTE Rel-10 UE can receive multiple CCs, where the CCs have, or at least the possibility to have, the same structure as a Rel-8 carrier.

The number of aggregated CCs as well as the bandwidth of the individual CCs may be different for uplink and downlink. A symmetric configuration refers to the case where the number of CCs in downlink and uplink is the same whereas an asymmetric configuration refers to the case where the number of CCs is different in downlink and uplink. It should be noted that the number of CCs configured in a cell may be different than the number of CCs perceived by a UE or wireless device: A UE may for example support more downlink CCs than uplink CCs, even though the cell is configured with the same number of uplink and downlink CCs.

During initial access an LTE Rel-10 UE or wireless device behaves similar to an LTE Rel-8 UE or terminal. Upon successful connection to the network a UE may, depending on its own capabilities and the network, be configured with additional CCs in the UL and DL. Configuration is based on Radio Resource Control, RRC. Due to the extensive signaling and rather slow speed of RRC signaling, it is envisioned that a UE may be configured with multiple CCs even though not all of them are currently used. If a UE is configured on multiple CCs, this would imply the UE has to monitor all DL CCs for PDCCH and PDSCH. This further implies a wider receiver bandwidth, higher sampling rates, etc. resulting in high power consumption.

To mitigate above problems, LTE Rel-10 supports activation of CCs on top of configuration. The UE monitors only configured and activated CCs for PDCCH and PDSCH. Since activation is based on Medium Access Control (MAC) control elements—which are faster than RRC signaling—activation/de-activation can follow the number of CCs that is required to fulfill the current data rate needs. Upon arrival of large data amounts multiple CCs are activated, used for data transmission, and de-activated if not needed anymore. All but one CC—the DL Primary CC (DL PCC) forming a PCell such as "PCell 1" in FIG. 1—may be inactivated by putting them in inactive state. Activation provides therefore the possibility to configure multiple CCs to serve corresponding SCells but only activate them on a need basis. Most of the time a UE would have one or very few CCs in active state, as signaled by the above-described SCell status, resulting in a lower reception bandwidth and thus battery consumption.

Scheduling of a CC may be done on the PDCCH via downlink assignments. Control information on the PDCCH is formatted as a Downlink Control Information (DCI) message. In Rel-8, a UE only operates with one DL and one UL CC, the association between DL assignment, UL grants and the corresponding DL and UL CCs is therefore clear. In Rel-10, two modes of CA needs to be distinguished: The first case is very similar to the operation of multiple Rel-8 UEs, a DL assignment or UL grant contained in a DCI message transmitted on a CC is either valid for the DL CC itself or for associated (either via cell-specific or UE specific linking) UL CC.

A second mode of operation augments a DCI message with the Carrier Indicator Field (CIF). A DCI containing a DL assignment with CIF is valid for that DL CC indicted with CIF and a DCI containing an UL grant with CIF is valid for the indicated UL CC.

DCI messages for downlink assignments contain among others resource block assignment, modulation and coding scheme related parameters, HARQ redundancy version, etc. In addition to those parameters that relate to the actual downlink transmission, most DCI formats for downlink assignments also contain a bit field for Transmit Power Control (TPC) commands. These TPC commands may be used to control the uplink power control behavior of the corresponding PUCCH that is used to transmit the HARQ feedback.

In LTE Rel-10, the transmission of PUCCH may be mapped onto one specific uplink CC, the UL Primary CC (UL PCC). UEs only configured with a single DL CC (which is then the DL PCC) and UL CC (which is then the UL PCC) are operating dynamic ACK/NACK on PUCCH according to Rel-8. The first Control Channel Element (CCE) used to transmit PDCCH for the DL assignment determines the dynamic ACK/NACK resource on Rel-8 PUCCH. Since only one DL CC is cell-specifically linked with the UL PCC, no PUCCH collisions can occur since all PDCCH are transmitted using different first CCE.

Upon reception of DL assignments on a single Secondary CC (SCC) serving an SCell or reception of multiple DL assignments, CA PUCCH should be used. A DL SCC assignment alone is untypical. The eNB scheduler should strive to schedule a single DL CC assignment on the DL PCC and try to inactivate SCCs if not needed. A possible scenario that may occur is that eNB schedules the UE on multiple DL CCs including the PCC. If the UE misses all but the DL PCC assignment, it will use Rel-8 PUCCH instead of CA PUCCH. To detect this error case, the eNB needs to monitor both the Rel-8 PUCCH and the CA PUCCH.

In Rel-10 LTE, the CA PUCCH format is based on the number of configured CC. Configuration of CC is based on RRC signaling. After successful reception/application of the new configuration a confirmation message is sent back making RRC signaling very safe.

WLAN Operation in Unlicensed Bands

There is plenty of available spectrum in the unlicensed bands, and these bands are today widely used by WLAN or Wi-Fi. The sharing of the spectrum in Wi-Fi can be done by dividing the total bandwidth into a number of channels. In the 2.4 GHz band, the channels are typically 20 MHz wide, and up to 13 channels are defined. These are partially overlapping, and may thus interfere with one another. Typically, three non-overlapping channels are used in the 2.4 GHz band. For the 5 GHz band, many more channels are available as the available bandwidth is much greater. However, with the development of IEEE 802.11n and IEEE 802.11ac, the bandwidth has been increased from 20 MHz to 40, 80, and even 160 MHz. Thus, in particular when the wider bandwidths are used, the number of non-overlapping channels is still rather small.

In typical deployments of WLAN, the access points (APs) are allocated such that the used channels, as far as possible, are not overlapping. In practice, this often means that one tries to maximize the distance between APs using the same channel.

It was mentioned above for action 3:2 that the base station 300 may adopt the LBT mechanism to ensure that the frequency of the SCell is not used for other transmissions before transmitting on the SCell. In the context of WLAN, there is a mechanism of listening to a radio channel before transmitting on the channel which is sometimes referred to as Carrier Sense Multiple Access, CSMA/Collision Avoidance, CA. For channel access, CSMA/CA may be used. This means that the channel is sensed, and only if the channel is declared or sensed as Idle, a transmission is initiated. In case the channel is declared or sensed as Busy, the transmission is essentially deferred until the channel is found Idle. This mechanism basically corresponds to the above-described Listen Before Talk, LBT. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

Figure 10:
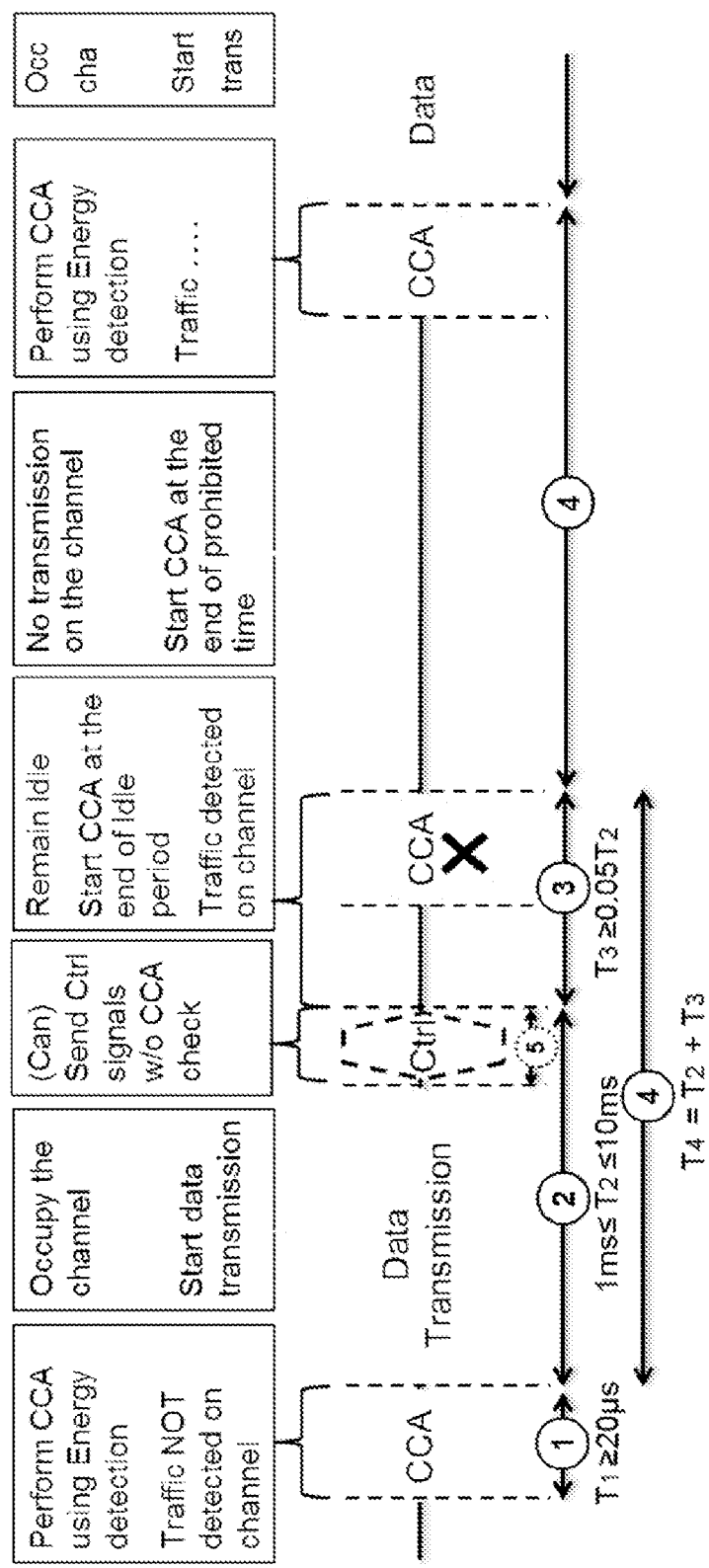
FIG. 10 is a schematic illustration of a procedure for Listen Before Talk, LBT, which may be performed by a base station in at least some of the embodiments herein.

A general illustration of the listen before talk, LBT, mechanism is shown in FIG. 10 where CCA is short for Controlled Channel Access which corresponds to the LBT mechanism. In this figure, "CCA" implies an operation where the UE monitors the channel for certain time periods as follows, to determine whether the channel is Busy or Idle. The frame based LBT framework allows a UE to perform a CCA operation per fixed frame period for a duration of T1, as illustrated in FIG. 10. If the channel is found to be busy after CCA operation, the UE shall defer the fixed frame period, denoted by T4 in FIG. 10, and shall not transmit during this fixed frame period. If the channel is found to be available after the CCA operation, the UE can transmit immediately for a duration up to 10 ms where this period is referred to as the "channel occupancy time" and denoted by T2 in FIG. 10. After this period, the UE is required to remain silent for at least 5% of said channel occupancy time, shown as T3 in FIG. 10, which is known as the "idle period". At the end of the required idle period, the equipment can resume CCA for channel access.

Up to now, the spectrum licensed to and used by LTE networks is dedicated exclusively to LTE. This has the advantage that the LTE networks do not need to care about the coexistence issue and the spectrum efficiency can be maximized. However, the spectrum allocated to LTE is limited which cannot meet the ever increasing demand for larger throughput from users/applications/services. Therefore, 3GPP now initiates a new study item, i.e. to enable LTE to work in unlicensed spectrum as well. The unlicensed spectrum is thus not reserved for LTE, but other systems and technologies can use it as well. Therefore, LTE networks need to consider the coexistence issue with other system, e.g. Wifi. If LTE networks would work as it is in unlicensed spectrum, then Wifi cannot work at all as Wifi won't transmit once it detects the channel is occupied.

Furthermore, one way to utilize the unlicensed spectrum reliably is to defer essential control signals and channels on a licensed carrier. An example of license-assisted access to unlicensed spectrum using LTE carrier aggregation is shown in FIG. 11, In this example, a UE 1100 may be connected to a PCell 1102 provided by a base station 1104 in the licensed band with separate bands for uplink and downlink transmissions, denoted 1102a and 1102b, respectively, and to one or more SCells provided by the base station 1104 in the unlicensed band 1106 which is used for both uplink and downlink transmissions. In this example, the base station 1104 performs control signaling on the licensed band of PCell 1102 while data communication can be performed on the unlicensed band of SCell 1104.

Small Cell On/Off Operation on Secondary Cells

Dense deployments of "small" cells are attractive to increase system capacity. A small cell may correspond to an SCell which can be activated and inactivated, also referred to as on/off operation, by putting the SCell in active and inactive state, respectively, as described above e.g. for FIG. 3. However, dense deployments typically have fewer UEs connected to each cell and lower resource utilization with higher rates provided when the cells are used. Reference signal structures that are developed for regular deployments with existing systems such as 3GPP LTE may have too high a density so that substantial amounts of unnecessary interference are created when deployments become dense. Reference signals may be transmitted even when there is no data being sent to UEs. In order to tackle this problem of unnecessary interference, solutions to turn small cells off when they are not being used are being discussed in 3GPP LTE. In small cells on/off, it is desirable for the transition time between on and off states to be as fast as possible to improve the performance. The cell state may therefore change within milliseconds to tens of milliseconds which is much faster than the time scales corresponding to the dormant mode type of operation standardized in 3GPP LTE RAN3.

When the small cell layer is configured as a secondary cell layer, carrier aggregation is by definition supported. The small cells, i.e. SCells, can be inactivated if no data traffic is needed to be handled by the small cell layer, that is when the traffic demand is sufficiently low to be handled by a large cell layer such as the PCell 1 in FIG. 3. At the stage when the traffic demand increases from one or more UEs, the network judges that the PCell cannot handle the increased traffic demand alone, and the network will then activate the SCell as well to meet the increasing traffic demand. However, in an activated Scell there might be instances that the cell can go off due to for example absence of traffic or downlink traffic completion and turns on again if packets arrive. Such a mechanism can trigger the small cells to rapidly turn on or off in a dynamic fashion.

A problem with existing solutions is that whether eNB can transmit or not on the secondary carrier, i.e. unlicensed spectrum, depends on the results of LBT and UE does not know this information. This will have impact on UE measurement related behavior. When UE does measurement on those frame/subframes that eNB does not transmit at all, the measurement results will be inaccurate and this will affect UE performance in the end.

It was also mentioned above that the wireless device 302 in FIG. 3 may acquire from the base station 300 a frame/subframe on which the SCell status can be monitored in group/common signaling and a group/common RNTI to be used for detecting the group/common signaling. A possible embodiment is to notify all LTE UEs in a cell using a group/common signaling via the LTE primary cell which uses dedicated LTE spectrum that LTE eNB cannot send any signals in the secondary cell which uses unlicensed spectrum in the following radio frame (typically a period of 10 ms) so that all UEs working with this LTE unlicensed spectrum can adapt their corresponding behavior.

In another embodiment, a group/common signaling via the LTE PCell may be used to notify monitoring UEs that LTE SCell signals will be transmitted in the unlicensed spectrum for a certain number subframes.

In further possible embodiments, the group/common signaling may be designed to enable fast decoding and processing by the UE. In one possible embodiment, the signaling is implemented via the physical dedicated control channel (PDCCH) that is scrambled by a group/common RNTI. In another possible embodiment, the signaling is implemented via modification of the physical hybrid-ARQ indication channel (PHICH).

All the above signaling on Pcell for the UEs in secondary cells may also be used in the context of small cell on/off where all carriers are on licensed bands. In this case, various types of triggers such as packet arrivals or completion may change the future state of the secondary cells being on and off where the above mentioned signaling can be used to notify the UEs in the secondary cells.

It should be noted that all embodiments described herein are applicable to scenarios where none, some or all of the secondary cells are operating in licensed or unlicensed bands except when explicitly stated otherwise.

eNB Behavior

Since once an eNB cannot transmit on the secondary cell in the unlicensed spectrum, all LTE UE in a cell which work with LTE unlicensed spectrum in a secondary cell need to know this information, this signaling should be a group/common signaling.

Another applicable scenario is in the context of small cell on/off where the secondary cells are deployed on a licensed or unlicensed carrier. The same type of signaling to inform UEs in secondary cell is needed when, for example, due to the lack of traffic, the eNB is not going to transmit on the secondary cell until data is available.

Signaling Format

In a possible embodiment, the signaling may be carried by the PDCCH scrambled by a new group/common RNTI to indicate unlicensed band SCell status (UBSS-RNTI). The PDCCH can be based on downlink control information DCI Format 1C if the number of bits for the unlicensed band SCell status signaling is limited. If more bits are needed, a different format such as the DCI format 1A, DCI format 1 or DCI format 3 can be used. The UBSS-RNTI should be provided to a UE capable of operating in the license-assisted mode as part of the carrier aggregation configuration to operate the licensed band Pcell and the unlicensed band Scell. This embodiment also covers the case when the primary and secondary cells are both in licensed bands.

In another possible embodiment, the signaling may be carried by the PHICH. The specific PHICH resource(s) carrying the unlicensed band SCell status can be designed in a set of different embodiments. In one implementation, a fixed embodiment can be written in the LTE specs to be followed universally. In another implementation, the specific signaling periodicity and opportunities can be semi-statically configured via higher-layer signaling (this may be the LTE radio resource control (RRC) layer signals). The eNB shall avoid scheduling physical uplink shared channel (PUSCH) that will use the PHICH dedicated to unlicensed band SCell status indication. This embodiment also covers the case when the primary and secondary cells are both in licensed bands.

In another possible embodiment, the signaling may be carried by a new physical channel in the control region for PCFICH/PDCCH/PHICH. The new physical channel could be mapped on the basis of Resource Element Groups (REG). For the REGs that are used by the new physical channel, the modulation and the resource mapping can be predefined in the LTE specification. One non-limiting implementation is to map the new channel to the remaining REGs which could not have one CCE in the control region. As an alternative, the signaling is carrier by a new physical channel in EPDCCH. The resource mapping can be on the basis of Enhanced REGs (EREGs) and predefined or configured by RRC.

Signaling Configuration

Depending on the frame structure of LTE unlicensed spectrum in secondary carrier, and in which subframe the LTE eNB carries out LBT, the subframe in which this group/common signaling is transmitted may be designed in various different embodiments. In one possible non-limiting implementation, a fixed embodiment may be written in the LTE specs to be followed universally. In another implementation, the specific signaling periodicity and opportunities can be semi-statically configured via higher-layer signaling. For example, this may be the LTE radio resource control (RRC) layer signals.

In another non-limiting implementation, the indicating periodicity may be set to 10 ms to match to the LTE radio frame length comprising ten subframes 0-9, as shown in FIG. 12. In this example, the eNB executes LBT at subframe 1 and then the group/common signaling is sent at subframe 2. The content of this group/common signaling is described below.

These signaling configurations may be used in the context of small cell on/off where instead of LBT, triggers such as packet arrival or completions can be used to turn on/off the secondary cells.

Signaling Content

It was mentioned above that the base station may signal the SCell status by one bit or by multiple bits indicating whether respective multiple SCells will be in the active state or in the inactive state. Thus, the signaling in action 3:3 of FIG. 3 may comprise one bit indicating that no radio signal will be transmitted on the associated SCell for the next indicated period. In a non-limiting exemplary implementation, the unlicensed band (or licensed band in the case of small cell on/off) SCell status may be signaled every radio frame (10 ms) to indicate whether the LTE signal will be transmitted on the Scell in the following radio frame.

The base station may in action 3:3 of FIG. 3 further signal a multiplicity of bits indicating that LTE signals will not be transmitted on a multiplicity of associated SCells for the next indicated period. For example, the signaling may be a bit map representing whether LTE signals will be transmitted on the associated SCells individually. The signaling can also include signaling a specific Time Division Duplex, TDD, UL/DL configuration that the eNB will use for a given time durations. In one example, the DCI message directly indicates one of the UL/DL configurations and the message is valid for a time duration of 10 subframes. Another possibility is that the message indicates what subframes that will be DL subframes only, i.e. the UL subframes are not indicated. Further alternative is that the bitmap indicates the subframe direction. The subframe direction could be either UL, DL or flexible. If flexible is indicates the eNB can indicate the subframe direction at a later stage by scheduling UEs either in UL or DL.

It was mentioned above that the signaled SCell status may comprise an activity value indicating a number of subframes in which the at least one SCell will be in active state, or multiple activity values valid for respective multiple SCells, each activity value indicating a number of subframes in which each respective SCell will be in active state. For example, the signaling may comprise an activity value indicating that radio signals will be transmitted from the base station 300 for a certain number of subframes on the associated SCell for the next indicated period. In a non-limiting exemplary implementation, the unlicensed band (or licensed band in the case of small cell on/off) SCell status may be signaled every radio frame (10 ms) to indicate the number of subframes in which LTE signals will be transmitted on the Scell in the following radio frame.

It is also possible to signal a multiplicity of activity values indicating the number of subframes that will contain LTE signals on the associated SCells for the next indicated period. This embodiment may also be used to signal the number(s) of subframes that LTE signals will not be transmitted on the associated SCell(s).

The multiplicity of values may be signaled as an ordered list of activity values corresponding to the ordered list of associated SCells, where SCell order is understood and synchronized on the eNB and the UE sides. That is, the first signaled value is associated with the first SCells and the second signaled value is associated with the second SCells. In an alternative embodiment, the signaling may comprise pair(s) of SCell index and the activity values to explicitly indicate the unlicensed band (or licensed band in the case of small cell on/off) SCell status for the specific Scell(s).

In another possible embodiment, the signaling may comprise a bit map indicating which specific subframes will contain LTE signals on the associated SCell for the next indicated period. This embodiment may further include to signal a multiplicity of bit maps to indicate the specific subframes on each of the associated SCells that will contain LTE signals.

Another possibility is that the subframes or radio frames on the associated SCell(s) not indicated to contain a LTE signal may contain signals using a different radio access technology. For example, wireless LAN signals may be transmitted instead.

UE Behavior

When attaching to the network, the UE may notify the eNB that it has the capability to work in unlicensed spectrum, and it was described above that the wireless device 302 of FIG. 3 may notify the base station 300, e.g. in action 3:1, that it is capable of being served by the SCell on unlicensed frequency spectrum. This may for example be signaled in action 3:1 by the UE in the band combinations that the UE can handle carrier aggregation, i.e. the UE signals that it supports carrier aggregation between one or more unlicensed bands together with one or several different licensed bands.

UE may also acquire from the eNB, information on which frame/subframe to monitor this group/common signaling and what is the group/common RNTI to receive this signaling. This information may also be stored in a memory of the UE.

Once the UE detects this group/common signaling, the UE is able to adapt its behavior, e.g. in the manner described above for action 3.5.

For RRM, e.g. secondary carrier add/remove via RRC reconfiguration, the UE should not do any measurement in the indicated frame/subframes and the current L1 and L3 measurement results will not be updated. This helps to avoid wrong secondary carrier add/remove decision.

For periodic CQI report, if the CSI reference resource subframe is within the frame that eNB will not transmit due to LBT and the SCell is put in inactive state, then this CSI reference resource subframe is not a valid subframe, and the UE needs to look for another CSI reference resource subframe that is valid.

For Discontinuous Reception, DRX, the UE can turn off its receiver working in the unlicensed spectrum carrier for the designated period, so as to avoid unnecessary power consumption by the UE.

Neighboring eNBs

It was further mentioned above that the base station may signal the SCell status to one or more neighboring base stations so that they may adapt their operation accordingly. If a neighboring eNB receives the SCell status indicating that the SCell is in active state, i.e. occupied, for a certain duration, it may refrain from using the spectrum of the SCell, e.g. unlicensed spectrum, for the occupied duration. To more effectively support neighboring eNBs receiving such a subframe occupation message indicating that the SCell is in active state, the SCell status may be transmitted on the unlicensed spectrum that is used. The SCell status signaling may further contain an indication of which operator the message is from. If the neighboring eNB identifies that the message is from the same operator's network, the neighboring eNB can use the spectrum. This, as it is assumed that deployed eNB is sufficiently separated spatially or alternatively as other interference mitigation techniques may be used within the same operators' network. If, however, the SCell status signaling comes from another operator, the receiving eNB may refrain from using the spectrum.

To be able to identify the operator, the received DCI message may be scrambled with an operator specific RNTI. Another alternative is that the DCI message is scrambled with a common RNTI, which is thus non-operator specific, but the operator identification is indicated in the actual message. This could for example be a bit sequence, wherein the operators that are deployed in the same area agree among themselves which ID should indicate which operator.

Potential Advantages

With the mechanisms of the embodiments described herein, the UE is able to know if the eNB will actually transmit signals with data or not in advance, based on the signaled SCell status, and the UE can thus adapt its behavior accordingly, e.g. perform measurements on the transmitted signals. Thereby, the UE's measurement results will be more accurate, UE power can be saved, and the UE performance will ultimately be improved.

In addition, the same message may be used to indicate to neighboring eNB that the frequency is occupied which helps in coordinating eNB transmissions both within an operator and between different operators.

While the solution has been described with reference to specific exemplary embodiments, the description is generally only intended to illustrate the inventive concept and should not be taken as limiting the scope of the solution. For example, the terms "base station", "wireless terminal", "carrier", "PCell", "SCell" and "carrier aggregation" have been used throughout this description, although any other corresponding entities, functions, and/or parameters could also be used having the features and characteristics described here.

ABBREVIATIONS

CA Carrier Aggregation
CC Component Carrier
CCA Controlled Channel Access
CCE Control Channel Element
CFI Control Format Indicator
CRC Cyclic Redundancy Check
DCI Downlink Control Information
DFT Discrete Fourier Transform
DL Downlink
EPDCCH Enhanced PDCCH
LBT Listen Before Talk
LTE Long Term Evolution
NW Network
OFDM Orthogonal Frequency Division Multiplex
PCFICH Physical Control Format Indicator Channel
PDCCH Physical Downlink Control Channel
PHICH Physical Hybrid ARQ Indicator Channel
PUCCH Physical Uplink Control Channel
PUSCH Physical Uplink Shared Channel
PRB Physical Resource Block
PCell Primary Cell
RBG Resource Block Group
REG Resource Element Group
RRC Radio Resource Control
RNTI Radio Network Temporary Identifier
SCell Secondary Cell
TDD Time Division Duplex
UE User Equipment
UL Uplink
VRB Virtual Resource Block

The invention claimed is:

1. A method performed by a base station of a wireless network, for supporting radio communication between wireless devices and the base station, wherein the base station employs carrier aggregation with multiple carriers serving a primary cell (PCell) and at least one secondary cell (SCell), wherein the base station serves the PCell on licensed frequency spectrum and serves the at least one SCell on unlicensed frequency spectrum, the method comprising:
   applying a Listen-Before-Talk (LBT) mechanism to detect whether the unlicensed frequency spectrum of the at least one SCell is idle and available for radio communication;
   if the LBT mechanism indicates that the unlicensed frequency spectrum is idle:
      determining to transmit downlink signals on a carrier serving the at least one SCell; and
      signaling an SCell status, to the wireless devices, comprising an activity value indicating a time duration during which the at least one SCell will be in an active state.

2. The method according to claim 1, further comprising signaling the SCell status, indicating that the at least one SCell will be in an inactive state, to the wireless devices when the LBT mechanism indicates that the unlicensed frequency spectrum is not idle.

3. The method according to claim 1, wherein the SCell status is carried by a Physical Downlink Control Channel (PDCCH), scrambled by a Radio Network Temporary Identifier (RNTI) that indicates the SCell status.

4. The method according to claim 3, wherein the base station provides the RNTI to at least one of the wireless devices.

5. The method according to claim 1, wherein the SCell status is carried by a Physical Hybrid ARQ Indicator Channel (PHICH).

6. The method according to claim 1, wherein the SCell status is carried by a physical channel in a control region of a subframe.

7. The method according to claim 1, wherein the base station signals the SCell status on a carrier serving the PCell.

8. The method according to claim 1, wherein the signaled SCell status further comprises a bit indicating whether the SCell will be in the active state or in an inactive state.

9. The method according to claim 1, wherein the signaled SCell status further comprises multiple bits indicating whether respective multiple SCells will be in the active state or in an inactive state.

10. The method according to claim 1, wherein the signaled SCell status indicates that the at least one SCell will be in the active state for a predetermined time duration.

11. The method according to claim 1, wherein the signaled SCell status indicates that the at least one SCell will be in the active state according to an indicated Time Division-Duplex (TDD) uplink/downlink configuration during a certain time period, wherein the time period is predefined or indicated in the signaled SCell status.

12. The method according to claim 1, wherein the signaled SCell status comprises multiple activity values valid for respective multiple SCells, each activity value indicating a time duration in which each respective SCell will be in the active state.

13. The method according to claim 1, wherein the base station signals the SCell status to one or more neighboring base stations.

14. A base station of a wireless network, the base station being operable to support radio communication between wireless devices and the base station, wherein the base station employs carrier aggregation with multiple carriers serving a primary cell (PCell) and at least one secondary cell (SCell), wherein the base station is configured to serve the PCell on licensed frequency spectrum and serve the SCell on unlicensed frequency spectrum, the base station comprising:
communication circuitry configured for communication with the wireless devices; and
processing circuitry operatively associated with the communication circuitry and configured to:
apply a Listen-Before-Talk (LBT) mechanism to detect whether the unlicensed frequency spectrum of the at least one SCell is idle and available for radio communication;
if the LBT mechanism indicates that the unlicensed frequency spectrum is idle:
determine to transmit downlink signals on a carrier serving the at least one SCell; and
signal an SCell status, to the wireless devices, comprising an activity value indicating a time duration during which the at least one SCell will be in an active state.

15. The base station according to claim 14, wherein the processing circuitry is further configured to:
signal the SCell status, indicating that the at least one SCell will be in an inactive state, to the wireless devices when the LBT mechanism indicates that the unlicensed frequency spectrum is not idle.

16. The base station according to claim 14, wherein the SCell status is carried by a Physical Downlink Control Channel (PDCCH), scrambled by a Radio Network Temporary Identifier (RNTI) that indicates the SCell status.

17. The base station according to claim 16, wherein the processing circuitry is configured to provide the RNTI to at least one of the wireless devices.

18. The base station according to claim 14, wherein the SCell status is carried by a Physical Hybrid ARQ Indicator Channel (PHICH).

19. The base station according to claim 14, wherein the SCell status is carried by a physical channel in a control region of a subframe.

20. The base station according to claim 14, wherein the processing circuitry is configured to signal the SCell status on a carrier serving the PCell.

21. The base station according to claim 14, wherein the signaled SCell status by further comprises a bit indicating whether the SCell will be in the active state or in an inactive state.

22. The base station according to claim 14, wherein the signaled SCell status further comprises multiple bits indicating whether respective multiple SCells will be in the active state or in an inactive state.

23. The base station according to claim 14, wherein the signaled SCell status indicates that the at least one SCell will be in the active state for a predetermined time duration.

24. The base station according to claim 14, wherein the signaled SCell status indicates that the at least one SCell will be in the active state according to an indicated Time Division-Duplex (TDD) uplink/downlink configuration during a certain time period, wherein the time period is predefined or indicated in the signaled SCell status.

25. The base station according to claim 14, wherein the signaled SCell status comprises multiple activity values valid for respective multiple SCells, each activity value indicating a time duration in which each respective SCell will be in the active state.

26. The base station according to claim 14, wherein the processing circuitry is configured to signal the SCell status to one or more neighboring base stations.

27. A method performed by a wireless device operable for radio communication with a base station of a wireless network, the wireless device being capable of using carrier aggregation with multiple carriers serving a primary cell (PCell) and at least one secondary cell (SCell), wherein licensed frequency spectrum is used for the PCell, and unlicensed frequency spectrum is used for the at least one SCell, the method comprising:
receiving an SCell status from the base station, the SCell status comprising
an activity value indicating a time duration during which the at least one SCell will be in an active state, based on a determination that the unlicensed frequency spectrum is idle and available for radio communication; and
performing signal measurements on the SCell only during a time when the at least one SCell will be in the active state, in accordance with the activity value of the SCell status.

28. The method according to claim 27, wherein the wireless device notifies the base station that it is capable of being served by the SCell on unlicensed frequency spectrum.

29. The method according to claim 27, wherein the wireless device acquires from the base station a frame/subframe on which the SCell status can be monitored in group/common signaling and a group/common Radio Network Temporary Identifier (RNTI) to be used for detecting the group/common signaling.

30. The method according to claim 27, wherein the wireless device turns off reception on the at least one SCell when the SCell status indicates that the at least one SCell is inactive.

31. A wireless device configured for radio communication with a base station of a wireless network, the wireless device being capable of using carrier aggregation with multiple carriers serving a primary cell (PCell) and at least one secondary cell (SCell), wherein licensed frequency spectrum is used for the PCell, and unlicensed frequency spectrum is used for the at least one SCell, the wireless device comprising:
communication circuitry configured for communication with the base station; and
processing circuitry operatively associated with the communication circuitry and configured to:

receive an SCell status from the base station, the SCell status comprising
an activity value indicating a time duration in which the at least one SCell will be in an active state, based on a determination that the unlicensed frequency spectrum is idle and available for radio communication; and
perform signal measurements on the SCell only during a time when the at least one SCell will be in the active state, in accordance with the activity value of the SCell status.

32. The wireless device according to claim 31, wherein the processing circuitry is configured to notify the base station that it is capable of being served by the SCell on unlicensed frequency spectrum.

33. The wireless device according to claim 31, wherein the processing circuitry is configured to acquire from the base station a frame/subframe on which the SCell status can be monitored in group/common signaling and a group/common Radio Network Temporary Identifier (RNTI) to be used for detecting the group/common signaling.

34. The wireless device according to claim 31, wherein the processing circuitry is configured to turn off reception on the at least one SCell when the SCell status indicates that the at least one SCell is inactive.

35. A non-transitory, computer-readable storage medium storing a computer program comprising instructions that, when executed on at least one processor of a base station that is operable to support communication with wireless devices and that employs carrier aggregation with multiple carriers serving a primary cell (PCell) using licensed frequency spectrum and at least one secondary cell (SCell) using unlicensed frequency spectrum, cause the at least one processor to:

apply a Listen-Before-Talk (LBT) mechanism to detect whether the unlicensed frequency spectrum of the at least one SCell is idle and available for radio communication;
if the LBT mechanism indicates that the unlicensed frequency spectrum is idle:
determine to transmit downlink signals on a carrier serving the at least one SCell; and
signal an SCell status, to the wireless devices, comprising an activity value indicating a time duration during which the at least one SCell will be in an active state.

36. A non-transitory, computer-readable storage medium storing a computer program comprising instructions that, when executed on at least one processor of a wireless device that is capable of communication with a base station and that uses carrier aggregation with multiple carriers serving a primary cell (PCell) using licensed frequency spectrum and at least one secondary cell (SCell) using unlicensed frequency spectrum, cause the at least one processor to:
receive an SCell status from the base station, the SCell status comprising
an activity value indicating a time duration in which the at least one SCell will be in an active state, based on a determination that the unlicensed frequency spectrum is idle and available for radio communication; and
perform signal measurements on the SCell only during a time when the at least one SCell will be in the active state, in accordance with the activity value of the SCell status.

* * * * *

UNITED STATES PATENT AND TRADEMARK OFFICE
CERTIFICATE OF CORRECTION

| | | |
|---|---|---|
| PATENT NO. | : 12,088,535 B2 | Page 1 of 1 |
| APPLICATION NO. | : 15/125757 | |
| DATED | : September 10, 2024 | |
| INVENTOR(S) | : Cheng et al. | |

It is certified that error appears in the above-identified patent and that said Letters Patent is hereby corrected as shown below:

In the Specification

In Column 5, Line 45, delete "CSell" and insert -- SCell --, therefor.

In Column 18, Line 64, delete "carrier" and insert -- carried --, therefor.

In the Claims

In Column 23, Line 65, in Claim 21, delete "status by" and insert -- status --, therefor.

Signed and Sealed this
Second Day of September, 2025

Coke Morgan Stewart
*Acting Director of the United States Patent and Trademark Office*